United States Patent
Lee et al.

(10) Patent No.: US 8,963,876 B2
(45) Date of Patent: Feb. 24, 2015

(54) TOUCH SENSING SYSTEM AND DRIVING METHOD THEREOF

(75) Inventors: Dong-Won Lee, Yongin (KR); Hee-Chul Hwang, Yongin (KR)

(73) Assignee: Samsung Display Co., Ltd., Giheung-Gu, Yongin, Gyeonggi-Do (KR)

( * ) Notice: Subject to any disclaimer, the term of this patent is extended or adjusted under 35 U.S.C. 154(b) by 289 days.

(21) Appl. No.: 13/453,632

(22) Filed: Apr. 23, 2012

(65) Prior Publication Data

US 2013/0106735 A1     May 2, 2013

(30) Foreign Application Priority Data

Oct. 27, 2011   (KR) .................. 10-2011-0110514

(51) Int. Cl.
G06F 3/045    (2006.01)
G06F 3/044    (2006.01)
G06F 3/041    (2006.01)

(52) U.S. Cl.
CPC .............. *G06F 3/0416* (2013.01); *G06F 3/044* (2013.01)
USPC ....................................................... 345/174

(58) Field of Classification Search
USPC ................... 345/173–174; 178/18.01–18.03, 178/18.06–18.07
See application file for complete search history.

(56) References Cited

U.S. PATENT DOCUMENTS

| | | | | |
|---|---|---|---|---|
| 7,834,860 B2 * | 11/2010 | Muranaka | ........................ | 345/173 |
| 2010/0079397 A1 * | 4/2010 | Yang et al. | ................... | 345/173 |
| 2011/0298734 A1 * | 12/2011 | Ho et al. | ........................ | 345/173 |
| 2012/0182235 A1 | 7/2012 | Lee et al. | | |
| 2012/0293447 A1 * | 11/2012 | Heng et al. | ................... | 345/174 |

FOREIGN PATENT DOCUMENTS

| | | |
|---|---|---|
| KR | 10-0591042 | 6/2006 |
| KR | 10-2008-0039121 | 5/2008 |
| KR | 10-0875118 | 12/2008 |
| KR | 10-2012-0083693 A | 7/2012 |

* cited by examiner

*Primary Examiner* — Rodney Amadiz
(74) *Attorney, Agent, or Firm* — Robert E. Bushnell, Esq.

(57) ABSTRACT

A touch sensing system comprises: a touch sensing unit which includes regions having predetermined coordinates; and a baseline updating unit for updating a baseline by reflecting sensing signals outputted from the touch sensing unit. The baseline updating unit includes a comparator for calculating difference values between the sensing signal of an n-th frame and the baseline of an n–1-th frame for each region, and for comparing the difference values with predetermined reference values. The touch sensing system further comprises an arithmetic unit for setting the baseline of the n–1-th frame as the baseline of the n-th frame for a region in which the difference values are larger than the reference values and for the region adjacent to it, and for updating the baseline of the n-th frame by a predetermined arithmetic for a remaining region.

18 Claims, 3 Drawing Sheets

TOUCH SENSING SYSTEM AND DRIVING METHOD THEREOF

CLAIM OF PRIORITY

This application makes reference to, incorporates the same herein, and claims all benefits accruing under 35 U.S.C. §119 from an application earlier filed in the Korean Intellectual Property Office on the 27 Oct. 2011 and there duly assigned Serial No. 10-2011-0110514.

BACKGROUND OF THE INVENTION

1. Field of the Invention

The present invention relates to a touch sensing system and a driving method thereof and, more particularly, to a touch sensing system and a driving method thereof which improves touch sensitivity by sensing small change in sensing signals upon movement of touch by a user.

2. Description of the Related Art

The touch screen is an input apparatus for inputting a user's command by selecting an instruction content displayed on a screen of an image display apparatus and the like by a human's hands or an object.

To this end, the touch screen is positioned on a front face of the image display apparatus for converting a contact position directly contacted with a human's hands or an object into electrical signals. Accordingly, the instruction content selected at the contact position is received as input signals.

Since such a touch screen may replace separate input apparatuses, such as a keyboard and a mouse, to be connected to and operated with the image display apparatus, the range of its use has grown.

Types of arrangements for implementing the touch screen have included a resistive film type, an optical sensing type, a capacitance type, and the like.

Of these, the touch screen of the capacitance type detects touch positions by detecting change in the capacitance produced when a person's hands or objects contact the touch screen, and to this end, the touch sensing system is provided to detect the coordinates of the touch positions by analyzing the sensing signals outputted from a number of sensing electrodes.

That is, when the difference values between the sensing signals and the baselines are larger than predetermined reference values, it is determined that the touch of the user exists on the touch sensing system.

When there are no user inputs by fingers and there is also no influence of external noise, the values sensed by the touch sensing unit are constant, and the constant values are called baselines. That is, the baselines are basic input values which exists in the absence of any input on the touching sensing unit. Here, noise refers to unwanted signals that occur in the system due to electrical and mechanical causes.

In a touch sensing system of the related art, the baselines are updated to keep up with the sensing signal values changed by noise so as to minimize influence of the noise when the touch is absent, and the updating of the baselines stops when the touch is present, thereby detecting the difference between the sensing signals and the baselines.

However, in the case of moving after touching by the user without detaching fingers, there is a problem in that it is not recognized as a touch.

SUMMARY OF THE INVENTION

An advantage of the invention is that it provides a touch sensing system and a driving method thereof with improved touch sensitivity by sensing of small changes in the sensing signals upon movement of the touch of the user.

Another advantage of the invention is that it provides a touch sensing system comprising a touch sensing unit including a number of regions having a predetermined number of coordinates, and a baseline updating unit for updating baselines by reflecting sensing signals outputted from the touch sensing unit. The baseline updating unit includes a comparator for calculating difference values between the sensing signals of n-th frame and the baselines of an n−1-th frame for each of the regions, and for comparing the difference values with predetermined reference values, and an arithmetic unit for setting the baselines of an n−1-th frame as the baselines of an n-th frame for the region in which the difference values are larger than the reference values and the region adjacent to it, and for updating the baselines of an n-th frame by a predetermined arithmetic for the remaining region.

Furthermore, The arithmetic unit updates the baselines by the equation $B(n)=I(n)\times A+B(n-1)\times(1-A)$ (where $B(n)$ is the baseline of n-th frame, $I(n)$ is the sensing signal of n-th frame, $B(n-1)$ is the baseline of n−1-th frame, and $A$ is an updating coefficient).

Moreover, the touch sensing unit includes a number of sensor electrodes, and is operated by a capacitance type arrangement.

Furthermore, the touch sensing system further includes a filter unit for calculating an output signal of the n-th frame from the sensing signal of the n-th frame output from the touch sensing unit using the equation $F(n)=I(n)\times W+F(n-1)\times(1-W)$ (where $F(n)$ is the output signal of the n-th frame, $I(n)$ is the sensing signal of the n-th frame, $F(n-1)$ is the output signal of the n−1-th frame, and $W$ is a filtering coefficient), and for outputting the calculated output signal to an output stage.

In addition, the filtering unit calculates the filtering coefficient by the equation $$W = \frac{|I(n) - F(n-1)|}{R}$$

(where R is a scale factor) for the region in which the difference values are larger than the reference values.

Furthermore, the filtering unit calculates the filtering coefficient by the equation $$W = \frac{|I(n) - F(n-1)|}{cR}$$

(where c is an additional coefficient) for the region adjacent to the region in which the difference values are larger than the reference values.

In addition, the filtering coefficient is set in the range of $0 \le W \le 1$.

Moreover, the additional coefficient is set in the range of $1 \le c$.

A driving method of a touch sensing system of the present invention comprises (a) calculating difference values between a sensing signal of an n-th frame and a baseline of an n−1-th frame for each of the regions of a touch sensing unit, and comparing the difference values with predetermined reference values, and (b) setting the baseline of the n−1-th frame as the baseline of the n-th frame for the region adjacent to the region in which the difference values are larger than the reference values, and updating the baseline of the n-th frame by a predetermined arithmetic for the remaining region.

Furthermore, step (b) of setting the baseline of n−1-th frame updates the baseline by $B(n)=I(n)\times A+B(n-1)\times(1-A)$ (where B(n) is the baseline of the n-th frame, I(n) is the sensing signal of the n-th frame, B(n−1) is the baseline of the n−1-th frame, and A is an updating coefficient).

In addition, the touch sensing unit includes a number of sensor electrodes, and is operated by a capacitance type arrangement.

Furthermore, the driving method of the touch sensing system further comprises (c) calculating an output signal of the n-th frame from the sensing signal of the n-th frame output from the touch sensing unit using the equation $F(n)=I(n)\times W+F(n-1)\times(1-W)$ (where F(n) is the output signal of the n-th frame, I(n) is the sensing signal of the n-th frame, F(n−1) is the output signal of the n−1-th frame, and W is a filtering coefficient), and outputting the calculated output signal to an output stage.

Moreover, step (c) of calculating the output signal of the n-th frame calculates the filtering coefficient by the equation $$W = \frac{|I(n) - F(n-1)|}{R}$$

(where R is a scale factor) for the region in which the difference values are larger than the reference values.

Furthermore, step (c) of calculating an output signal of the n-th frame calculates the filtering coefficient by the equation $$W = \frac{|I(n) - F(n-1)|}{cR}$$

(where c is an additional coefficient) for the region adjacent to the region in which the difference values is larger than the reference values.

Moreover, the filtering coefficient is set in the range of $0 \leq W \leq 1$.

Furthermore, the additional coefficient is set in the range of $1 \leq c$.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
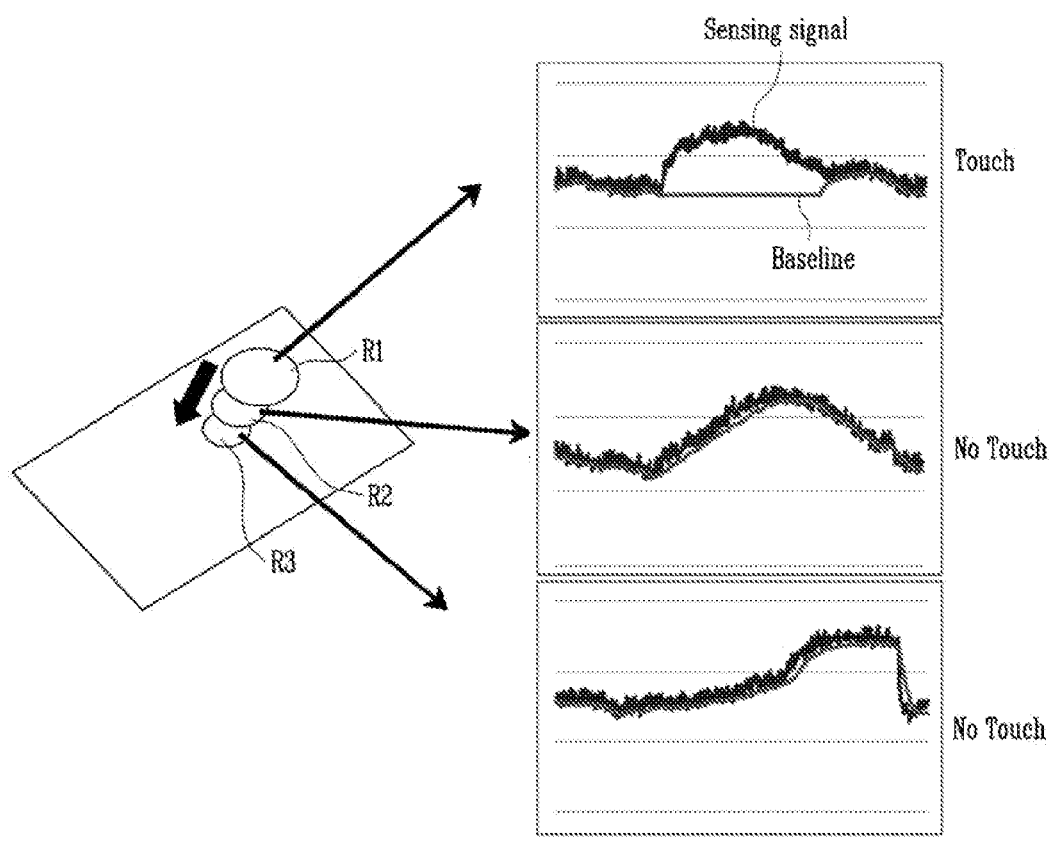
FIG. 1 shows operations of a touch sensing system of the related art.

In the following detailed description, only certain exemplary embodiments of the present invention have been shown and described, simply by way of illustration. As those skilled in the art will realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the other element with one or more intervening elements interposed therebetween. Also, when an element is referred to as being "connected to" another element, it can be directly connected to the other element or be indirectly connected to the other element with one or more intervening elements interposed therebetween. Hereinafter, like reference numerals refer to like elements.

The specifics of other embodiments are included in the detailed description and drawings.

Benefits and features of the disclosure and how to achieve them will become clear with reference to exemplary embodiments to be described in detail below along with the accompanying drawings. However, the present invention is not limited to the above-described specific embodiment, and can be variously modified by one skilled in the art without departing from the scope of the present invention as defined in the claims. In addition, parts that are not related to the disclosure of the drawings are omitted for clarity, and the same numerals are attached to similar parts throughout the specification.

Hereinafter, the touch sensing system and the driving method thereof of the present invention will be described with reference to exemplary embodiments of the disclosure and the drawings describing them.

FIG. 1 shows operations of a touch sensing system of the related art. It shows the case in which, after the user touches first region R1, the fingers are moved toward third region R3.

First, when the user touches the first region R1, since the difference values between the sensing signals and the baselines are larger than the reference value, it stops the updating of the baselines and recognizes the touch.

However, when the fingers are moved into second region R2 and third region R3, change in the sensing signals is small so that the baselines are kept up with. Therefore, the difference values between the sensing signals and the baselines are small, and the touch is not detected.

Therefore, despite the fact that the touch of an actual user is continually maintained up to first region R1, second region R2, and third region R3, there is problem in that the touch in the second region R2 and third region R3 is not detected.

Figure 2:
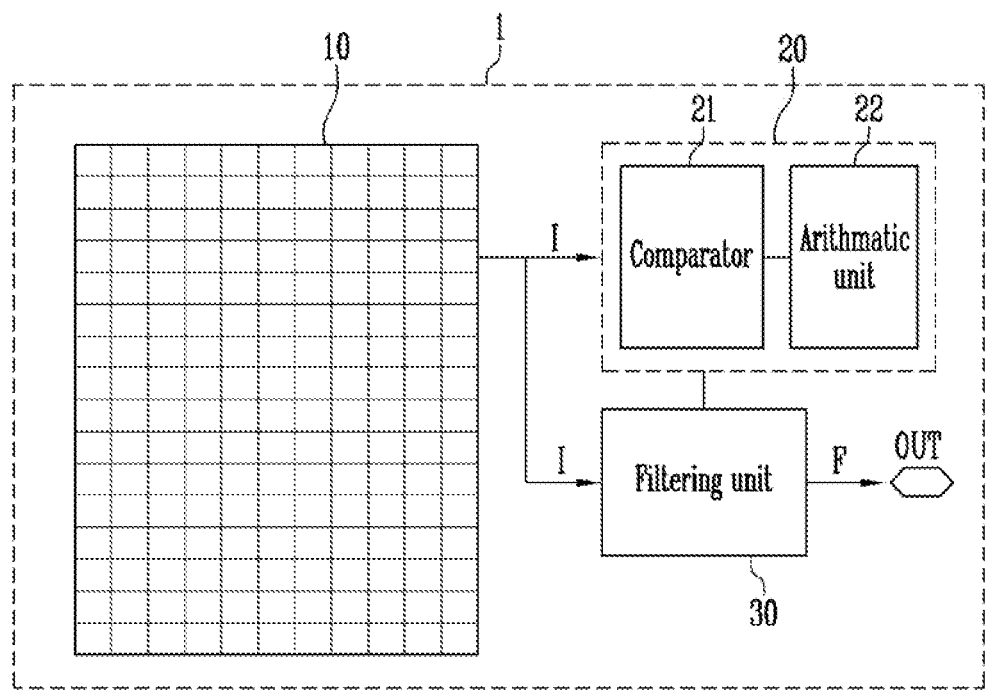
FIG. 2 shows the touch sensing system according to an embodiment of the present invention.

FIG. 2 shows the touch sensing system according to an embodiment of the present invention.

Referring to FIG. 2, the touch sensing system 1 according to an exemplary embodiment of the present invention includes a touch sensing unit 10 and a baseline updating unit 20.

The touch sensing unit 10, which is a touch sensor of the capacitance type including a number of sensing electrodes, includes a number of regions, each having predetermined coordinates.

Furthermore, the touch sensing unit 10 outputs sensing signals I from the sensing electrodes for each frame period.

The outputted sensing signals may represent a change in the capacitance formed in each of the corresponding regions such that it may determine whether or not a touch is performed.

The touch sensing unit 10 may be configured as a mutual capacitance type or a self capacitance type. Structures of each type are already widely known so that a detailed description of them is omitted.

The baseline updating unit 20 updates values of the baselines by processing the sensing signal I outputted from the touch sensing unit 10.

To this end, the baseline updating unit 20 may include the comparator 21 and the arithmetic unit 22.

The comparator 21 calculates difference values between the sensing signal (I(n)) of an n-th frame and the baseline (B(n−1)) of an n−1-th frame for each of the regions included in the touch sensing unit 10, and compares the difference values with predetermined reference values.

The reference values may be set by experiments and the like, and may be changed depending on sensitivity and the like of the touch sensing system 1.

That is, the comparator 21 may determine that a user touches the corresponding region when the difference values between the sensing signal (I(n)) of the n-th frame and the baseline (B(n−1)) of the n−1-th frame are larger than the predetermined reference values.

The arithmetic unit 22 sets the baseline (B(n−1)) of the n−1-th frame as the baseline (B(n)) of the n-th frame for the region in which the difference values between the sensing signal (I(n)) of the n-th frame and the baseline (B(n−1)) of the n−1-th frame are larger than the reference values and the region adjacent to it, and updates the baseline (B(n)) of the n-th frame by the predetermined arithmetic for the remaining region.

Figure 3:
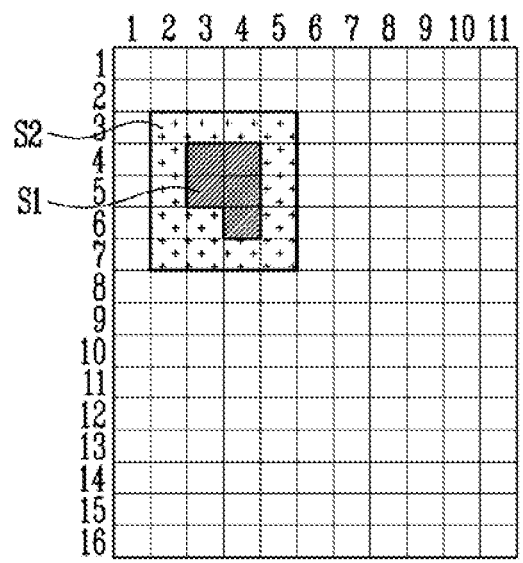
FIG. 3 is a reference view describing the operations of a comparator and an arithmetic unit of the present invention.

FIG. 3 is a reference view describing the operations of a comparator and an arithmetic unit of present invention. Here, for example, it will describe the case in which the user touches (3, 4), (4, 4), (3, 5), (4, 5) and (4, 6) regions (S1 region).

When the user touches (3, 4), (4, 4), (3, 5), (4, 5) and (4, 6) regions (S1 region), the magnitude of the sensing signals I of the corresponding region increases so that the difference values between the sensing signal (I(n)) of the n-th frame and the baseline (B(n−1)) of the n−1-th frame are larger than the predetermined reference values.

Accordingly, since the difference values calculated from (3, 4), (4, 4), (3, 5), (4, 5) and (4, 6) regions (S1 region) are larger than the reference values, the comparator 21 may determine that the user touches the corresponding region.

At this point, the arithmetic unit 22 stops the updating of the baselines for (3, 4), (4, 4), (3, 5), (4, 5) and (4, 6) regions (S1 region) and the regions (S2 region: (2, 3), (3, 3), (4, 3), (5, 3), (2, 4), (5, 4), (2, 5), (5, 5), (2, 6), (3, 6), (5, 6), (2, 7), (3, 7), (4, 7) and (5, 7)) adjacent to them, and it is determined by the comparator 21 that the difference values are larger than the reference values.

That is, in the regions (S1 region, S2 region), the baselines (B(n)) of the n-th frame are equally set with the baselines (B(n)) of the n−1-th frame (refer to the following Equation 1).

$$B(n)=B(n-1) \quad \text{[Equation 1]}$$

However, the arithmetic unit 22 updates the baselines by the predetermined arithmetic for the remaining regions.

At this point, the arithmetic unit 22 may update the baselines by the following equation 2:

$$B(n)=I(n) \times A + B(n-1) \times (1-A) \quad \text{[Equation 2]}$$

The updating coefficient (A) may be set by experiments and the like, and may be changed depending on sensitivity and the type of the touch sensing system 1.

The touch sensing system 1 of the present invention according to above-described embodiment may recognize all touches without exception, even in the case of movement after touching by the user without detaching fingers (e.g., a drawing operation) by stopping baseline updating of the region adjacent to the regions touched by the user.

Figure 4:
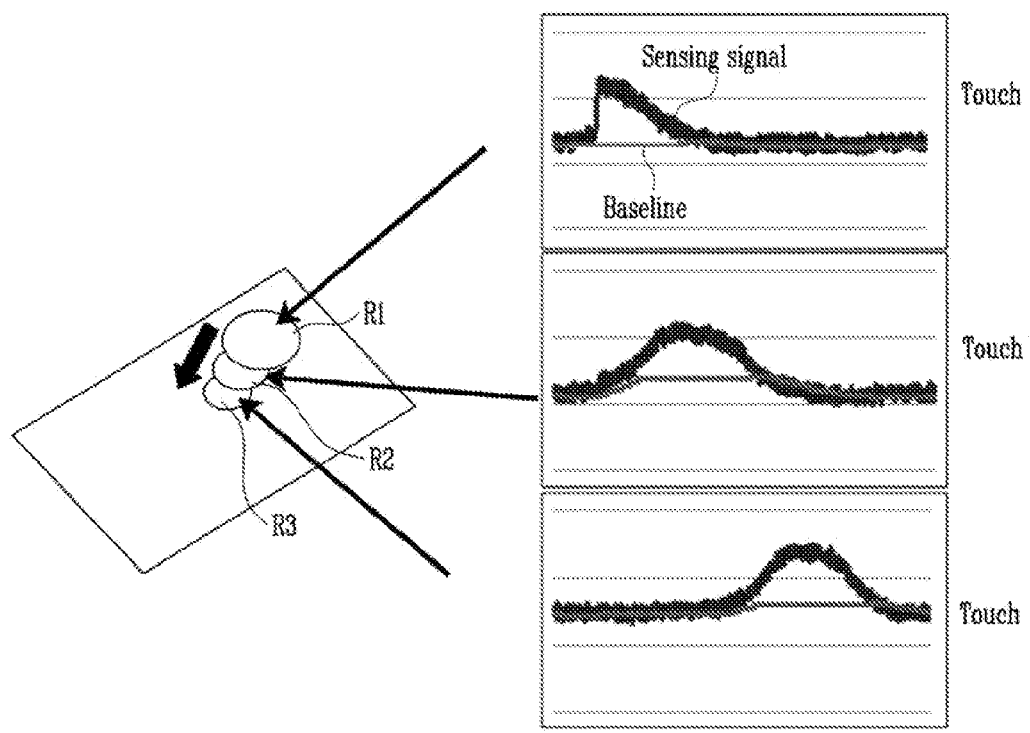
FIG. 4 shows touch recognition operations of the touch sensing system according to an embodiment of the present invention.

FIG. 4 shows touch recognition operations of the touch sensing system according to an embodiment of the present invention. Particularly, as in FIG. 1, after the user touches first region R1, the fingers are moved toward third region R3.

First, when the user touches the first region R1, since the difference values between the sensing signals and the baselines are larger than the reference values, it stops the updating of the baselines and recognizes the touch. Furthermore, even in the region adjacent to the first region R1, it stops the updating of the baselines.

Therefore, the updating of the baselines is not performed in the second region R2 adjacent to the first region R1 so that the baselines are not increased to keep up with the sensing signal.

Accordingly, even when the touch of the user is moved into the second region R2, since the difference values between the sensing signals and the baselines are larger than the reference values, it may recognize the touch.

Likewise, even when the touch of the user is moved into the third region R3, it may continually recognize the touch.

Referring back to FIG. 1, the touch sensing system 1 according to an exemplary embodiment of the present invention may further include a filtering unit 30.

The filtering unit 30 receives the sensing signals I detected by a touch sensing unit 10, and outputs an output signal F, calculated by performing the predetermined arithmetic for the sensing signals I, to the output stage OUT.

Figure 5:
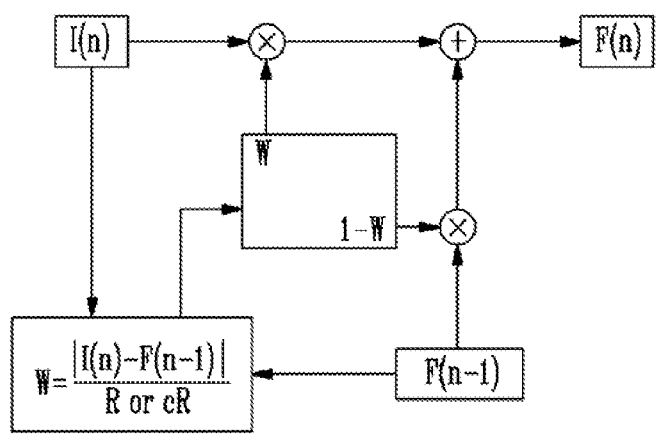
FIG. 5 shows arithmetic operations of the filtering unit according to an embodiment of the present invention.

FIG. 5 shows arithmetic operations of the filtering unit according to an embodiment of the present invention.

Referring to FIG. 5, in the filtering unit 30 of FIG. 1, an equation used to remove noise included in the sensing signals I is as follows:

$$F(n)=I(n) \times W + F(n-1) \times (1-W)$$

At this point, the filtering unit 30 calculates the filtering coefficient W by the following Equation 4 for the region in which the difference values between the sensing signals (I(n)) of the n-th frame and the baselines (B(n−1)) of the n−1-th frame are larger than the reference values, and calculates the filtering coefficient W by the following Equation 5 for the region adjacent to the region in which the difference values between the sensing signals (I(n)) of the n-th frame and the baseline (B(n−1)) of the n−1-th frame are larger than the reference values.

$$W = \frac{|I(n) - F(n-1)|}{R} \quad \text{[Equation 4]}$$

$$W = \frac{|I(n) - F(n-1)|}{cR} \quad \text{[Equation 5]}$$

At this point, it is preferable to set the range of the filtering coefficient W to $0 \leq W \leq 1$.

The important portion for which the coordinate should actually be detected is the region (for example, S1 region in FIG. 3) in which the difference values between the sensing signals (I(n)) of the n-th frame and the baselines (B(n−1)) of the n−1-th frame are larger than the reference values.

Accordingly, when the range of fluctuation for the output signal F outputted in the region (for example, S2 region in FIG. 3) adjacent to the region in which the difference values between the sensing signals (I(n)) of the n-th frame and the baselines (B(n−1)) of the n−1-th frame are larger than the reference values is large, this may significantly affect the coordinate detecting. Therefore, to lower the range of fluctuation of the outputted signal F output in the region adjacent to the region in which the difference values are larger than the reference values, the magnitude of the filtering coefficient W is lowered by multiplying scale factor R by an additional coefficient.

That is, the reflection rate of the output signal (F(n−1)) of the n−1-th frame is increased due to the lowering of the filtering coefficient W, while the reflection rate of the sensing signals (I(n)) of the n-th frame is lowered. Therefore, the range of fluctuation of the output signal (F(n)) of the n-th frame as compared to the output signal (F(n−1)) of the n−1-th frame, is lowered.

At this point, it is preferable to set the additional coefficient (c) to 1≤c.

A driving method of the touch sensing system according to an exemplary embodiment of the present invention comprises (a) comparing the reference values, and (b) updating the baselines.

In step (a), the comparing of the reference values calculates difference values between the sensing signals (I(n)) of the n-th frame and the baselines (B(n−1)) of the n−1-th frame for each of the regions of the touch sensing unit 10, and compares the difference values with the predetermined reference values.

In step (b), the updating of the baselines, the difference values calculated in the comparing of the reference values set the baselines (B(n−1)) of the n−1 th frame as the baseline (B(n)) of the n-th frame for the region larger than the reference values and the region adjacent to it, and update the baselines (B(n)) of the n-th frame by the predetermined arithmetic for the remaining region.

That is, the baseline values are maintained by the Equation 1 for the region in which the difference values calculated in the comparing of the reference values are larger than the reference values, and the region (for example, S1 region and S2 region in FIG. 3) adjacent to it, and the baseline values may be updated by the Equation 2 for the remaining region (the remaining region except for the S1 region and the S2 region in FIG. 3).

The driving method of the touch sensing system according to an exemplary embodiment of the present invention may further include step (c) filtering.

In step (c), the filtering, to output to the output stage OUT, the output signal (F(n)) of the n-th frame is calculated from the sensing signals (I(n)) of the n-th frame output from the touching sensing unit 10 using the Equation 3.

At this point, the filtering coefficient W is calculated by the Equation 4 for the region (for example, S1 region in FIG. 3) in which the difference values between the sensing signals (I(n)) of the n-th frame and the baselines (B(n−1)) of the n−1-th frame are larger than the reference values, and the filtering coefficient W is calculated by the following Equation 5 for the region (for example, S2 region in FIG. 3) adjacent to the region in which the difference values between the sensing signals (I(n)) of the n-th frame and the baselines (B(n−1)) of the n−1-th frame are larger than the reference values.

The present invention may provide a touch sensing system and a driving method which improve touch sensitivity by sensing small changes in sensing signals upon movement of the touch of the user.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A touch sensing system, comprising:
   a touch sensing unit including a number of regions having a predetermined number of coordinates; and
   a baseline updating unit for updating baselines by reflecting sensing signals outputted from the touch sensing unit;
   wherein the baseline updating unit includes:
   a comparator for calculating difference values between sensing signals of an n-th frame and baselines of an n−1-th frame for each of the regions, and for comparing the difference values with predetermined reference values; and
   an arithmetic unit for setting the baselines of the n−1-th frame as baselines of the n-th frame for a region in which the difference values are larger than the reference values and a region adjacent to it, and for updating the baselines of the n-th frame by a predetermined arithmetic for a remaining region.

2. The touch sensing system according to claim 1, wherein the arithmetic unit updates the baselines by Equation B(n)=I(n)×A+B(n−1)×(1−A), where B(n) is the baseline of n-th frame, I(n) is the sensing signal of the n-th frame, B(n−1) is the baseline of the n−1-th frame, and A is an updating coefficient.

3. The touch sensing system according to claim 1, wherein the touch sensing unit comprises a number of sensor electrodes, and is operated in a capacitance type manner.

4. The touch sensing system according to claim 1, further comprising a filtering unit for calculating an output signal of the n-th frame from the sensing signals of the n-th frame outputted from the touch sensing unit using Equation F(n)=I(n) W+F(n−1) (1−W), where F(n) is the output signal of the n-th frame, I(n) is the sensing signal of the n-th frame, F(n−1) is an output signal of the n−1-th frame, and W is a filtering coefficient, said filtering unit outputting the calculated output signal to an output stage.

5. The touch sensing system according to claim 4, wherein the filtering unit calculates the filtering coefficient for a region in which the difference values are larger than the reference values by Equation $$W = \frac{|I(n) - F(n-1)|}{R},$$

where R is a scale factor.

6. The touch sensing system according to claim 5, wherein the filtering coefficient W is set to a value in a range of 0≤W≤1.

7. The touch sensing system according to claim 4, wherein the filtering unit calculates the filtering coefficient for a region adjacent to a region in which the difference values are larger than the reference values by Equation $$W = \frac{|I(n) - F(n-1)|}{cR},$$

where c is an additional coefficient.

8. The touch sensing system according to claim 7, wherein the filtering coefficient W is set to a value in a range of 0≤W≤1.

9. The touch sensing system according to claim 7, wherein the additional coefficient is set to a value in a range of 1≤c.

10. A driving method for a touch sensing system, comprising the steps of:
(a) calculating difference values between sensing signals of an n-th frame and baselines of an n−1-th frame for each of regions of a touch sensing unit, and comparing the difference values with predetermined reference values; and
(b) setting the baseline of the n−1-th frame as a baseline of the n-th frame for a region in which the difference values are larger than the predetermined reference values and for a region adjacent to the region, and updating the baseline of the n-th frame by a predetermined arithmetic for a remaining region.

11. The driving method for the touch sensing system according to claim 10, wherein step (b) updates the baselines in accordance with $B(n)=I(n)\times A+B(n-1)\times(1-A)$, where $B(n)$ is the baseline of the n-th frame, $I(n)$ is the sensing signal of the n-th frame, $B(n-1)$ is the baseline of n−1-th frame, and A is an updating coefficient.

12. The driving method for the touch sensing system according to claim 10, wherein the touch sensing unit includes a number of sensor electrodes, and is operated in a capacitance type manner.

13. The driving method for the touch sensing system according to claim 10, further comprising step (c) of calculating an output signal of the n-th frame from the sensing signal of the n-th frame outputted from the touch sensing unit using Equation $F(n)=I(n)\times W+F(n-1)\times(1-W)$, where $F(n)$ is the output signal of the n-th frame, $I(n)$ is the sensing signal of the n-th frame, $F(n-1)$ is an output signal of the n−1-th frame, and W is a filtering coefficient, and outputting the calculated output signal to an output stage.

14. The driving method for the touch sensing system according to claim 13, wherein step (c) further comprises calculating the filtering coefficient for the region in which the difference values are larger than the reference values by Equation $$W = \frac{|I(n) - F(n-1)|}{R},$$

where R is a scale factor.

15. The driving method for the touch sensing system according to claim 14, wherein the filtering coefficient is set to a value in a range of $0 \leq W \leq 1$.

16. The driving method for the touch sensing system according to claim 13, wherein step (c) further comprises calculating the filtering coefficient for the region adjacent to the region in which the difference values are larger than the reference values by Equation $$W = \frac{|I(n) - F(n-1)|}{cR},$$

where c is an additional coefficient.

17. The driving method for the touch sensing system according to claim 16, wherein the filtering coefficient is set to a value in a range of $0 \leq W \leq 1$.

18. The driving method for the touch sensing system according to claim 16, wherein the additional coefficient is set to a value in a range of $1 \leq c$.

* * * * *